US008985380B2

(12) United States Patent
Cook

(10) Patent No.: US 8,985,380 B2
(45) Date of Patent: Mar. 24, 2015

(54) SELF-SEALING FUEL CELL AND METHODS OF USE

(75) Inventor: Richard L. Cook, Flagstaff, AZ (US)

(73) Assignee: CCCIP, LLC, Camp Verde, AZ (US)

( * ) Notice: Subject to any disclaimer, the term of this patent is extended or adjusted under 35 U.S.C. 154(b) by 20 days.

(21) Appl. No.: 13/351,622

(22) Filed: Jan. 17, 2012

(65) Prior Publication Data

US 2012/0181207 A1    Jul. 19, 2012

Related U.S. Application Data

(60) Provisional application No. 61/433,388, filed on Jan. 17, 2011.

(51) Int. Cl.
*F17C 1/00* (2006.01)
*B60K 15/03* (2006.01)

(52) U.S. Cl.
CPC ....... *B60K 15/03* (2013.01); *B60K 2015/03065* (2013.01); *B60K 2015/03407* (2013.01)
USPC ................................. 220/560.02; 220/560.01

(58) Field of Classification Search
USPC ............ 220/560.02, 560.01, 560.1, 585, 723; 206/524.3, 524.4, 524.9
See application file for complete search history.

(56) References Cited

U.S. PATENT DOCUMENTS

| | | | | |
|---|---|---|---|---|
| 3,509,016 A | * | 4/1970 | Wickersham, Jr. et al. | 220/560.02 |
| 3,664,904 A | * | 5/1972 | Cook | 428/102 |
| 3,698,587 A | * | 10/1972 | Baker et al. | 428/63 |
| 3,698,597 A | * | 10/1972 | Burke | 220/86.2 |
| 3,980,106 A | * | 9/1976 | Wiggins | 138/140 |
| 4,088,240 A | * | 5/1978 | San Miguel | 220/560.02 |
| 4,422,561 A | * | 12/1983 | Grosvenor et al. | 220/560.02 |
| 4,925,057 A | * | 5/1990 | Childress et al. | 244/135 R |
| 5,082,138 A | * | 1/1992 | McGarvey | 220/560.01 |
| 5,383,567 A | * | 1/1995 | Sorathia et al. | 220/4.13 |
| 6,491,180 B2 | * | 12/2002 | Distelhoff et al. | 220/562 |
| 8,043,676 B2 | * | 10/2011 | Ohnstad et al. | 428/35.7 |
| 8,240,502 B2 | * | 8/2012 | Childress et al. | 220/560.01 |
| 8,505,761 B2 | * | 8/2013 | Tweet et al. | 220/560.02 |
| 2002/0053568 A1 | * | 5/2002 | Balzer et al. | 220/4.14 |
| 2006/0169393 A1 | * | 8/2006 | Botts et al. | 156/115 |
| 2007/0009694 A1 | * | 1/2007 | Monk et al. | 428/35.7 |
| 2008/0264951 A1 | * | 10/2008 | Tweet et al. | 220/560.02 |
| 2011/0253726 A1 | * | 10/2011 | Monk et al. | 220/560.02 |
| 2012/0181288 A1 | * | 7/2012 | Childress et al. | 220/586 |

* cited by examiner

*Primary Examiner* — Fenn Mathew
*Assistant Examiner* — Christopher McKinley
(74) *Attorney, Agent, or Firm* — The Noblitt Group, PLLC

(57) ABSTRACT

Various embodiments provide a self-sealing system comprising a visco-elastic sealant material, an enclosed multi-cell structure surrounding the visco-elastic sealant material, and an integral pressure reservoir configured to maintain positive pressure within the enclosed multi-cell structure and provide potential energy to move the visco-elastic sealant material. In one embodiment, the enclosed multi-cell structure can have first and second skins, and an outer edge configured to contain visco-elastic sealant material between first and second skins. In one embodiment, the enclosed multi-cell structure can also have a plurality of nodes configured to connect first 100 and second skins. In one embodiment, at least one of the nodes has elasticity and can function as a tension spring. In one embodiment, at least one of nodes is loaded with releasable tension to provide a portion of the potential energy to move the visco-elastic sealant material.

24 Claims, 9 Drawing Sheets

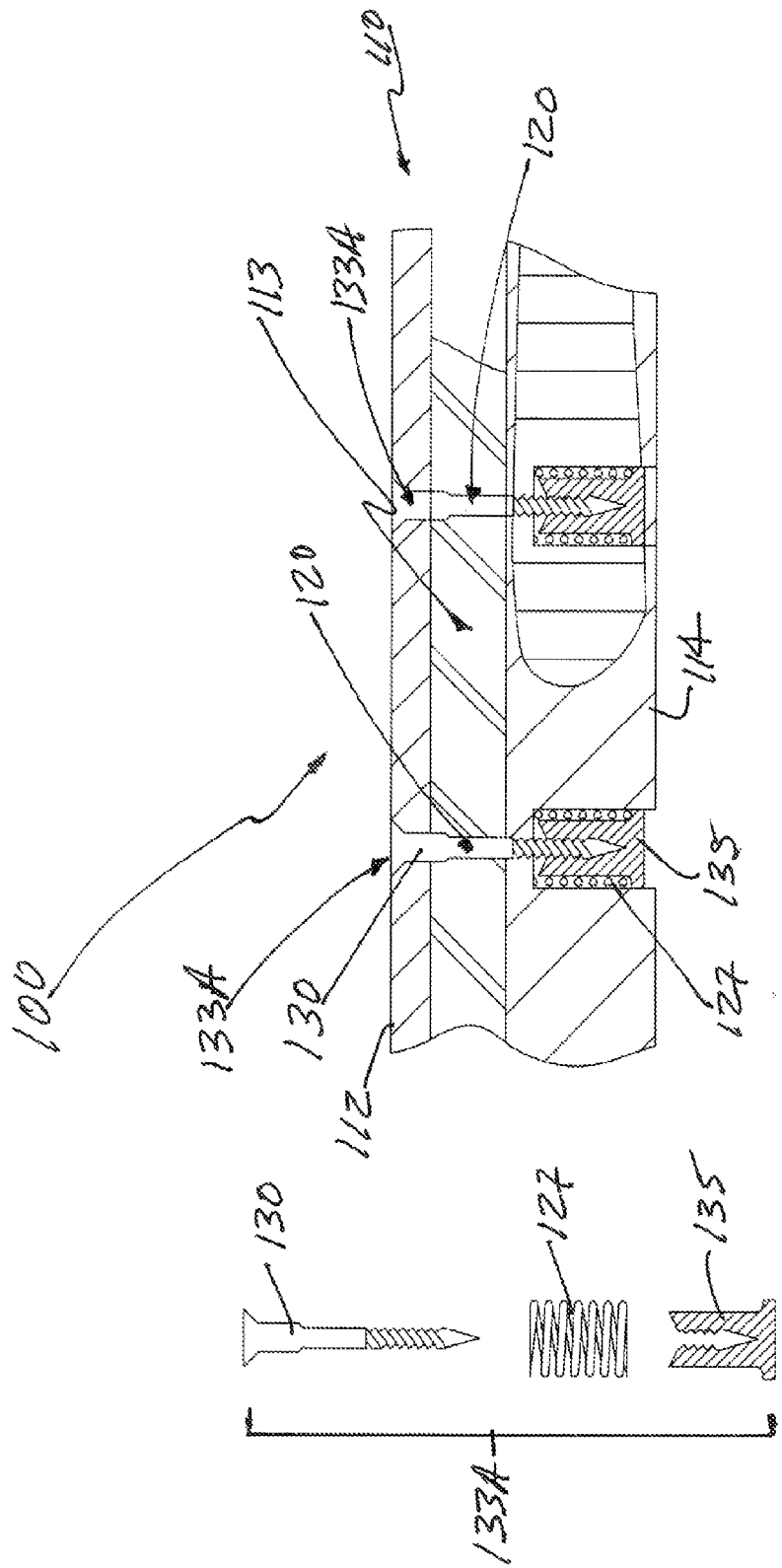

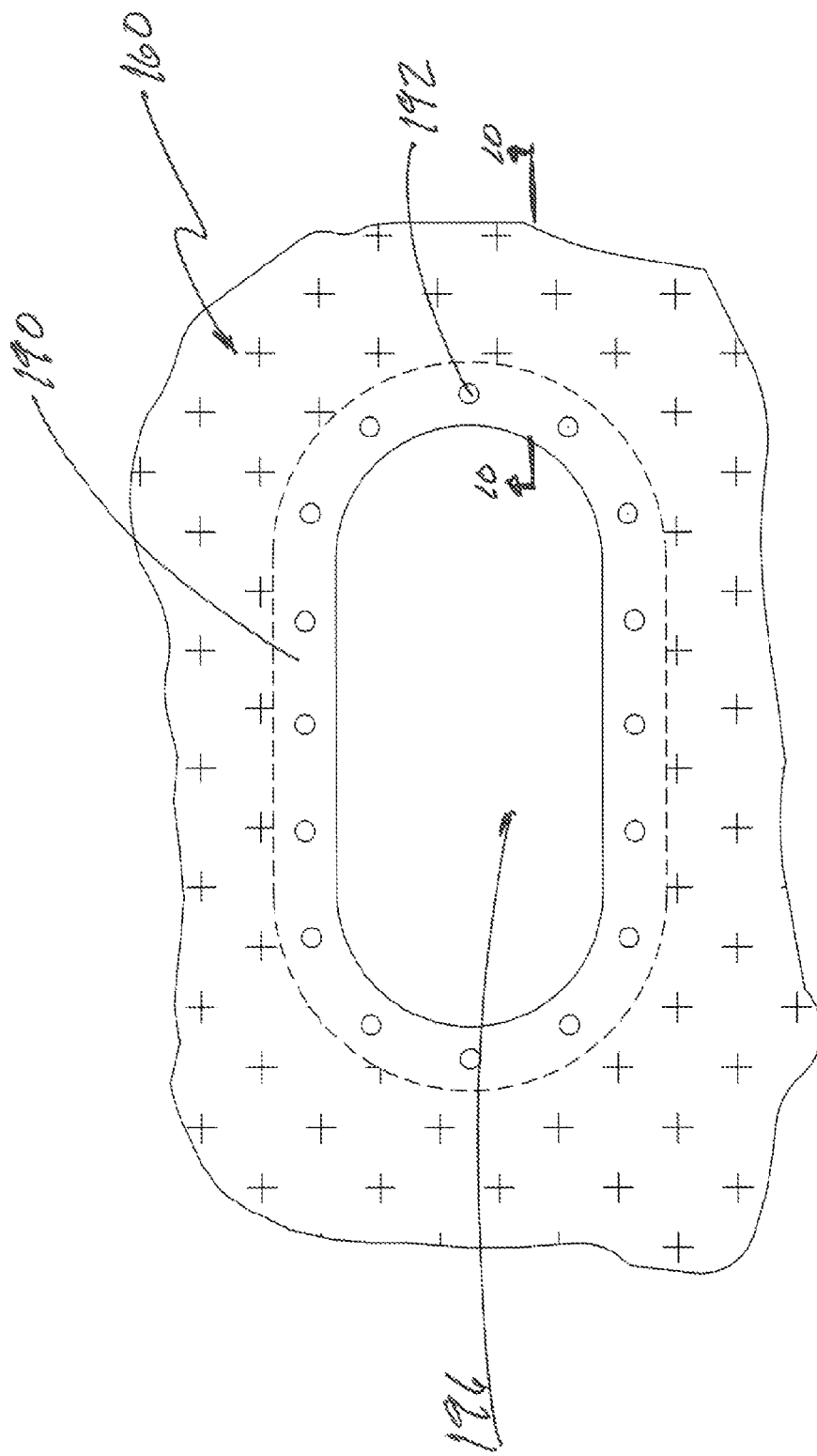

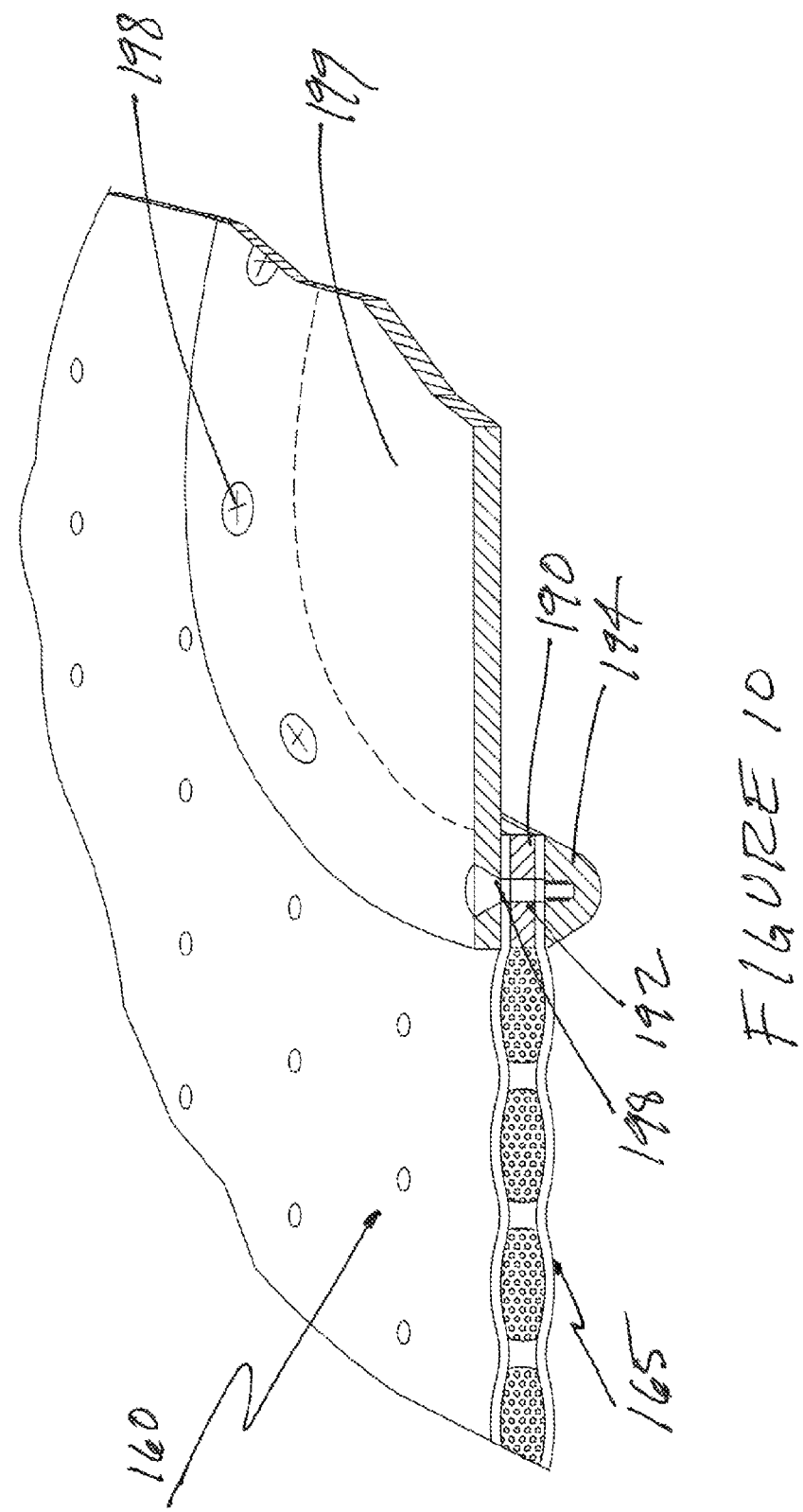

SELF-SEALING FUEL CELL AND METHODS OF USE

CROSS-REFERENCE TO RELATED APPLICATIONS

The present application claims the benefit of and priority to Provisional Patent Application Ser. No. 61/433,388, entitled SELF-SEALING FUEL CELL AND METHODS OF USE, filed on Jan. 17, 2011 and incorporates the disclosure of the application by reference.

BACKGROUND OF INVENTION

Piercing a container holding a liquid can lead to the liquid escaping from the container. Various consequences of a pierced container can include loss of a valuable liquid or contamination of an environment by the liquid. Consequences of pierced fuel tank or fuel cell include loss of fuel, which will cause an engine using the fuel to cease operation. In battle conditions, a breached fuel tank can lead to the downing of a plane or the abandonment of a land vehicle on the battlefield.

Protecting fuel tanks from enemy fire by the addition of armor may affect the flight worthiness of aircraft or the mobility of a land vehicle. Accordingly, retrofitting aircraft or a land vehicle with armor to protect a fuel tank is very limited.

Other attempts to protect fuel tanks exposed to battle conditions have included the use of self-sealing bladders that contain an uncured gum rubber layered between two non-permeable membranes. When a projectile, such as a bullet penetrates the bladder, the fuel inside the bladder makes contact with the raw rubber, which swells to seal the wound created by the projectile. However, such bladders are limited due to weight constraints, and/or size of a penetration.

SUMMARY OF THE INVENTION

Various embodiments provide a self-sealing system. In some embodiments, a self-sealing system can comprise a visco-elastic sealant material, an enclosed multi-cell structure surrounding the visco-elastic sealant, material, and an integral pressure reservoir configured to maintain a positive pressure within the enclosed multi-cell structure and configured to provide potential energy to move the visco-elastic sealant material. In one embodiment, the enclosed multi-cell structure can have a first skin, a second skin, and an outer edge configured to contain the visco-elastic sealant material between the first skin and the second skin. In one embodiment, the enclosed multi-cell structure can also have a plurality of nodes configured to connect the first skin and the second skin. In one embodiment, at least one of the nodes is configured to break upon penetration through the multi-cell structure and release of a portion of the positive pressure within the enclosed multi-cell structure. In one embodiment, at least one of nodes is loaded with a releasable tension to provide a portion of the potential energy to move the visco-elastic sealant material.

In some embodiments, a method of use of the self-sealing system can include the steps of initiating a flow of the sealant material in response to a penetration into the enclosed cell structure, and sealing the penetration into the enclosed cell structure with the sealant material. In addition, the method can include the steps of holding a fluid within a container comprising the enclosed multi-cell structure within a wall of the container, and preventing essentially all of the fluid from escaping through the penetration into the enclosed cell structure.

In some embodiments, a self-sealing system can comprise a multi-cell structure having a first surface, a second surface, an outer edge configured to contain a volume between the first surface and the second surface, and plurality of nodes within the volume and configured to connect the first surface and the second surface; a visco-elastic sealant material filling the volume; a pressure reservoir contained within the volume and configured to provide an internal positive pressure on the visco-elastic sealant material; and a tension load held in the nodes and configured to provide potential energy to push a portion of the visco-elastic sealant material.

Various embodiments provide methods of sealing a penetration into a container. In some embodiments, a method of sealing a penetration in a container includes the steps of holding a visco-elastic sealant material under positive pressure enclosed inside a wall of a container; releasing potential energy enclosed inside the wall upon a penetration through the wall; forcing a flow of the visco-elastic sealant material with the released energy from inside the wall and into the penetration through the wall; filling the penetration through the wall with a portion of the visco-elastic sealant material; achieving an elastic equilibrium of the portion of the visco-elastic sealant material in the penetration through the wall; essentially stopping the flow of the visco-elastic sealant material into the penetration through the wall upon the achieving the elastic equilibrium; and preventing contents within the container from escaping the container through the penetration through the wall.

In one embodiment, the method can include sealing the penetration in the container with the sealant material. In one embodiment, the method can include preventing a chemical or a physical reaction or interaction between the sealant material and the contents in the container. In one embodiment, the method can include plugging the penetration in the container with the sealant material.

BRIEF DESCRIPTION OF THE DRAWINGS

The present disclosure will become more fully understood from the detailed description and the accompanying drawings, wherein:

FIG. 2 is a partial cross-sectional view illustrating a self-sealing system comprising an alternative fastener, in accordance with various embodiments;

FIG. 3 is fragmented cross-sectional view illustrating the alternative fastener of FIG. 2, in accordance with various embodiments;

FIG. 9 is a partial top view illustrating an access hole, in accordance with various embodiments; and FIG. 10 is a partial cross-sectional view illustrating an example of the access hole of FIG. 9 and a cover, in accordance with various embodiments.

DETAILED DESCRIPTION

Figure 1:
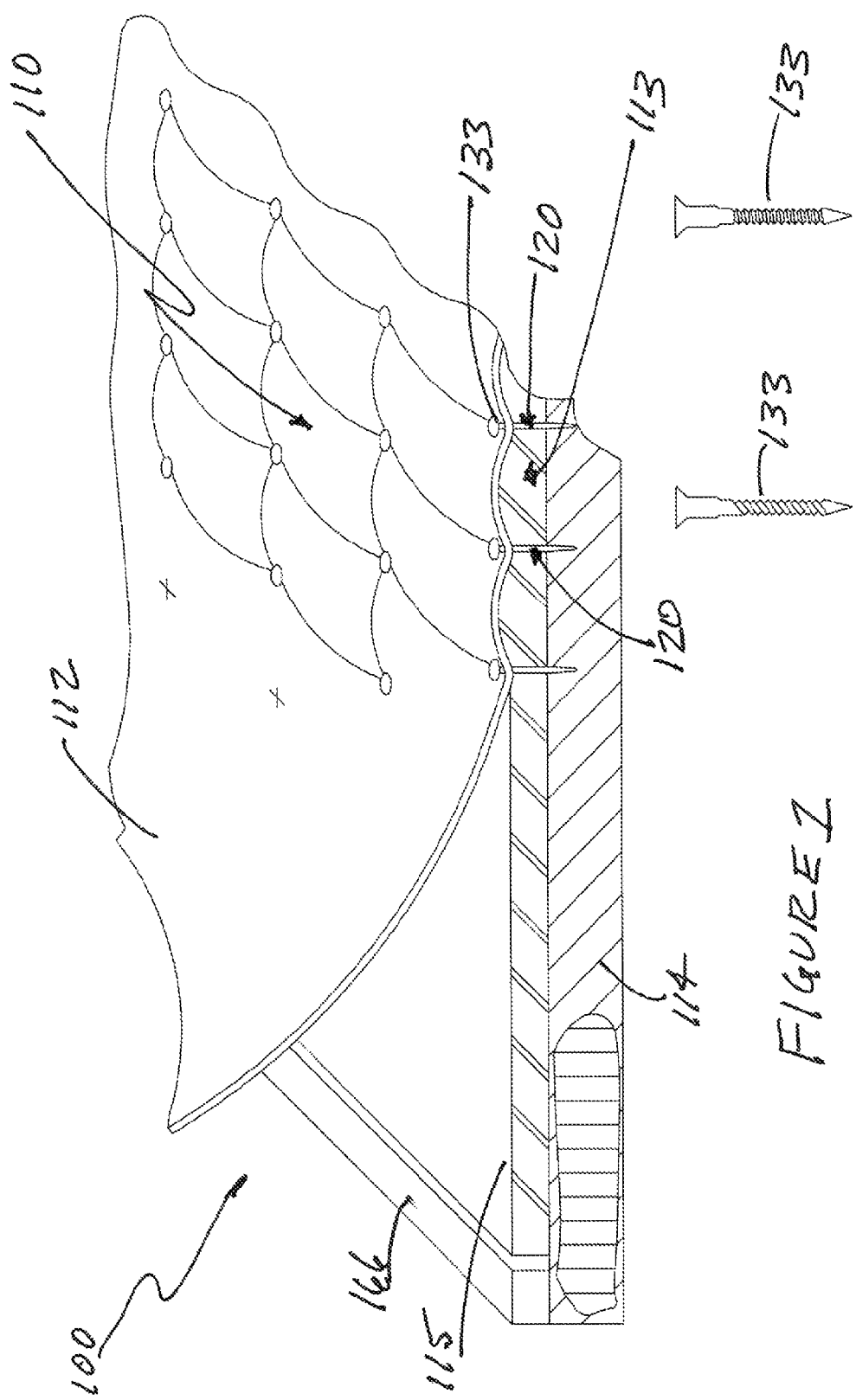
FIG. 1 is a partial cross-sectional view illustrating a self-sealing system, in accordance with various embodiments.

The following description is merely exemplary in nature and is in no way intended to limit the various embodiments, their application, or uses. As used herein, the phrase "at least one of A, B, and C" should be construed to mean a logical (A or B or C), using a non-exclusive logical or. As used herein, the phrase "A, B and/or C" should be construed to mean (A, B, and C) or alternatively (A or B or C), using a non-exclusive logical or. It should be understood that steps within a method may be executed in different order without altering the principles of the present disclosure.

The drawings described herein are for illustration purposes only and are not intended to limit the scope of the disclosed embodiments in any way. The drawings described herein are for illustrative purposes only of selected embodiments and not all possible implementations, and are not intended to limit the scope of any of the various embodiments. It is understood that the drawings are not drawn to scale. For purposes of clarity, the same reference numbers will be used in the drawings to identify similar elements.

According to various embodiments, a self-sealing system can comprise a cell structure, a sealant material, and a pressure reservoir. In one embodiment, a self-sealing system can comprise a multi-cell structure located between two surfaces, a visco-elastic sealant material under positive pressure and in the multi-cell structure. In one embodiment, the cell structure, the sealant material, and the pressure reservoir, each work synergistically with the others, to provide an effective seal to a penetration or a cored wound in the self-sealing system.

The basic cell structure may have several different forms, but in most cases, relies on a rigid backing capable of retaining its desired shape under dynamic loading conditions. One such structure that has desirable weight and strength properties comprises a honeycomb made of aluminum, which sandwiched between two fiberglass skins. A cell of self-sealing system can be an integral part of this rigid backing or may be a completely independent structure.

According to various embodiments, the self-sealing system can comprise a visco-elastic gum, contained under pressure within a multi-node cell structure. When a cell wall is breached, the pressure at the wound or penetration site drops, and the gum flows from surrounding high-pressure regime into the wound thus sealing the wound. In accordance to various embodiments, a self-sealing system, as described herein, can be designed to accommodate a wide range of containment needs, such as, for example, caustic acid tanks, corrosive gases, hazardous waste, hypergolic fuels, synthetic fuels, and standard hydrocarbon fuels, including, but not limited to, gasoline, diesel, kerosene, jet fuel, and combinations thereof.

According to various embodiments, sealing material, such as, for example, a gum-based sealant, can be designed for a wide range of temperatures, and is easily modified by those skilled in art for either high flow capability or low flow capability. In one embodiment, sealant material can be formulated for resisting chemical attack from almost any known hazardous waste material. Ability of the sealant material to seal a wound can be completely independent of the sealant material reacting either chemically or physically with a fluid contained in a self-sealing system. If the sealant material is formulated to resist a chemical and/or physical attack from the fluid contained within, the probability of contamination to the contained fluid is minimal to negligible. Since sealing material has elasticity, the sealing of large gaping wounds, such as those being larger than 1 inch in diameter has been shown. This elastic property of the sealant material enables the self-sealing system to be particularly effective against sharp projecting objects, explosive fragments, and wounds created by shaped charges.

Unexpected results have been achieved in the development of the self-sealing system. As discussed herein, past sealing technologies have been based on a rubber layer swelling upon contact with a hydrocarbon based fluid inside a container to seal a wound. In contrast, the current innovation of the self-sealing system, described herein, does not depend on the swelling of a rubber layer. Unexpectedly when new sealant materials were developed, it has been found that these sealing materials can be contained under pressure within a cell wall and are capable of flowing from the surrounding sectors of the cell wall and into the wound area to create a seal. These unexpected results allow self-sealing system to effectively respond to a large wound or penetration that has been created by a projectile. These unexpected results allow self-sealing system to effectively respond to a non-circular wound created by a tumbling projectile. These unexpected results allow self-sealing system to effectively seal a wound created by a jagged fragment resulting from an explosive charge. The sealant material may be visco-elastic in nature and can be designed to prevent washout from the wound by fuel over-pressure. The sealant material can be designed to have an elastic equilibrium, which allows sealant material to plug the wound and stop a continuous uncontrolled flow of the sealant material to the wound.

When a container holding a liquid or gas is punctured, fluid (which can be a liquid or a gas or a combination thereof or a mixture thereof further comprising a portion of a solid material, as a colloid or a suspension) escapes from a container. Examples of a container can include a drum or a storage tank, a fuel tank, or any other fluid holding container, now known or developed in the future. The self-sealing system can be employed with any container, which can hold a fluid. In one embodiment, the self-sealing system can be formed into the container which can hold a fluid. In one embodiment, a drum or a storage tank or a container can comprise the self-sealing system, which, for example, can prevent leakage of hazardous materials. In one embodiment, a storage drum or a storage tank or a container can comprise the self-sealing system, which, for example, can prevent the loss of a rare material or a material of high economic value.

In one embodiment the self-sealing system can be employed in a space vehicle or a structure, such as a space station, located in either vacuum conditions of outer space or a low pressure atmosphere of a planet or a moon. For example, a wall of a space vehicle can comprise the self-sealing system, which can be initiated upon an impact of space debris that creates a penetration in the wall. The self-sealing system seals the penetration, as described herein, preventing air within the space vehicle from escaping into space. In another example, a wall of a structure on a planet or a moon can comprise the self-sealing system, which can be initiated upon an impact of a man-made object or space debris that creates a penetration in the wall. The self-sealing system seals the penetration, as described herein, preventing air within the structure from escaping.

In various embodiments, the self-sealing system can be employed in the containment of hydrocarbon liquids, such as for example, gasoline, kerosene, aviation fuel, diesel, JP-1, JP-2. JP-3, JP-4, JP-5, JP-6, JP-7, JP-8, JPTS, Jet-A, Jet-B, other like fuels, fuel additives, and combinations thereof. In various embodiments, the self-sealing system can be fabricated into fuel tanks. For example, such a fuel tank may be designed for application in aircraft, military vehicles, military armor, boats, or performance vehicles, such as race cars. In one embodiment, a fuel tank comprising the self-sealing system can seal damage from a projectile that pierces the fuel tank and can prevent fuel loss.

In various embodiments, a cell structure, a sealant material, and a pressure reservoir, each work synergistically with the others, to provide an effective seal to a penetration or a cored wound in the self-sealing system.

Although the cell structure can be designed in various different ways, in one embodiment, the cell structure may comprise a substrate which is a sandwich construction of a rigid honeycomb center, which is laminated on either side with fiberglass skins. Connected to this substrate by means of multiple tie points, which are generally equally spaced, is a second skin. A space exists between the substrate and the second skin and a cell can be defined by the space within the dimensions of four orthogonal tie points. A plurality of cells can be defined in the cell structure and the cells communicate with each other so that the sealant material can flow laterally through the cell structure.

In various embodiments, a tie down can hold the cell walls together. In one embodiment, a tie down can be rigid, which is typically a mechanical device that is driven through the second skin, the sealant material and into the substrate. For example, a rigid tie down can be a screw, a rivet, a nut and bolt, a barb, or any other appropriate fastener. In some embodiments, the rigid tie down can further comprise a bias member, such as for example a compression screw. In one embodiment, a tie down can be elastic, which is typically integrated into both of the opposing substrates or into a first surface and a second surface. For example, the cell walls and the tie downs are one integral unit. An elastic tie down or node connector may have one or more advantages, such as, for example, the tie downs may create a pressure reservoir analogous to an integral tension spring; another, for example being that no rigid or metal fasteners are needed, which lowers weight and eliminates the possibility of rigid tie downs becoming projectiles that can reenter the self-sealing system; a pressure reservoir can be created using a variety of pressurization methods and combinations thereof; and ease of forming intricate shapes of for example fuel tanks. According to various embodiments, a tie down point may be referred to as a node, and a tie down may be referred to as a fastener or a node connector, herein.

In various embodiments, the sealant material may be both plastic and elastic. The plastic property of the sealant material allows at least a certain amount of lateral flow through the cell structure toward the penetration or the cored wound. The elastic property of the sealant material prevents continued oozing of the sealant material through the penetration or the cored wound. This elastic property of the sealant material prevents the seal on the penetration or cored wound from being flushed away by a hydrostatic head of the fluid held by the self-sealing system. The sealant material has an operating temperature range at which both the plastic property and the elastic property of the sealant material perform as described herein. As will be apparent to those skilled in the art, that at very high temperatures, the viscosity of the sealant material will tend to drop, which may affect one of the plastic property and the elastic property. If the temperature is high enough, the sealant material may melt or boil, depending on the type of sealant material used. Also as will be apparent to those skilled in the art, at very low temperatures, the sealant material will tend to thicken, which may affect one of the plastic property and the elastic property. If the temperature is low enough, the sealant material may become essentially a solid.

In one embodiment, the sealant material has an operating temperature range from about −25° F. to about 160° F. In one embodiment, the sealant material has an operating temperature range from about 0° F. to about 160° F. In one embodiment, the sealant material has an operating temperature range from about −60° F. to about 160° F. In one embodiment, the sealant material has an operating temperature range from about −60° F. to about 180° F. In one embodiment, the sealant material has an operating temperature range from about −25° F. to about 180° F. In one embodiment, the sealant material has an operating temperature range from about 0° F. to about 180° F. In one embodiment, the sealant material has an operating temperature range from about −65° F. to about 350° F. In one embodiment, the sealant material has an operating temperature range from about −25° F. to about 350° F. In one embodiment, the sealant material has an operating temperature range from about 0° F. to about 350° F. In one embodiment, the sealant material has an operating temperature range from about −25° F. to about 150° F. In one embodiment, the sealant material has an operating temperature range from about 0° F. to about 150° F. In one embodiment, the sealant material has an operating temperature range from about −20° F. to about 100° F. In one embodiment, the sealant material has an operating temperature range from about −10° F. to about 100° F. In one embodiment, the sealant material has an operating temperature range from about 0° F. to about 100° F. As will be apparent to those skilled in the art, the cell structure can be constructed with various components in order to operate within the described temperature ranges. For example, the cell structure may comprise fluorosilicone or Nitrile rubber, for operation in the temperature ranges having upper temperatures of about 350° F.

In various embodiments, the pressure reservoir propels the sealant material to the penetration or the cored wound. A pressure reservoir can be integrated into the self-sealing system in by various means. In one embodiment, a gas can be added to the sealant material to form a pressurized foam. For example, high shear mixing the sealant material with a gas, such as for example nitrogen or carbon dioxide, or chlorofluorocarbon, such as for example, a CFC, such as, Freon, and then injecting the mixture under high pressure into the cell structure can create a self-contained pressure reservoir on the sealant material within the self-sealing system. In one embodiment, placement of an elastic second skin over a layer of the sealant material, which is on the substrate, and tying down the second skin to the substrate can compress the sealant material and stretch the second skin. For example, the second skin can be tied down using a rigid tie down, such as, a fastener, or a screw, which can force the second skin to essentially touch the substrate at the tie down point, which can be described as a node. In this example, the second skin has tension from the stretching and the sealant material has been compressed and both the tension and the compression provide a pressure reservoir able to propel the sealant material towards a penetration or a cored wound.

In various embodiments, a sealant material source may be connected to a cell structure to fill the cell structure with the sealant material, and as the pressure increases within the cell structure, the elastic component of the cell structure stretches thus creating the pressure reservoir. In one embodiment, once pressure in the cell structure has reached a predetermined value, the sealant material source may be removed and the cell structure may be sealed in order to maintain the pressure reservoir. For example, the sealant material can fill the cell structure at an elevated temperature and at a pressure of about 10 psi to about 60 psi. In one embodiment, the sealant material can fill the cell structure at an elevated temperature of about 180° F. and at a pressure of about 30 psi to about 100 psi. If the cell structure is over pressurized, the integrity of cell structure will be compromised and the pressure reservoir may not be contained within the cell structure. In one embodiment, the cell structure may be filled with sealant material to a predetermined displacement.

In various embodiments, a self-sealing system can comprise a visco-elastic sealant material; an enclosed multi-cell structure surrounding the visco-elastic sealant material; and an integral pressure reservoir configured to maintain a positive pressure within the enclosed multi-cell structure and configured to provide potential energy to move the visco-elastic sealant material.

In some embodiments, the enclosed multi-cell structure can comprise a first skin, a second skin, and an outer edge configured to contain the visco-elastic sealant material between the first skin and the second skin. In one embodiment, the enclosed multi-cell structure can comprise a plurality of nodes configured to connect the first skin and the second skin. In one embodiment, first skin can be, coupled to second skin with a plurality of nodes, which act as tension springs to create the pressure reservoir to pressurize the sealant material and cause the sealant material to move upon penetration. In one embodiment, at least one of the plurality of nodes is configured to break upon penetration into the multi-cell structure and release of at least a portion of the positive pressure within the enclosed multi-cell structure. In some embodiments, at least one of the plurality of nodes is loaded with a releasable tension configured to provide at least a portion of the potential energy to move the visco-elastic sealant material. In some embodiments, a portion of at least one of the first skin and the second skin is loaded with a releasable tension configured to provide at least a portion of the potential energy to move the visco-elastic sealant material. In some embodiments, a releasable tension load can be released from both the node and at least one of the first skin and the second skin to move the move the visco-elastic sealant material.

In some embodiments, at least one of the first skin and the second skin is non-rigid. In some embodiments, the enclosed multi-cell structure can comprise a first skin, a second skin, and an outer edge configured to hold the integral pressure reservoir between the first skin and the second skin. In one embodiment, the enclosed multi-cell structure is one continuous piece. In some embodiments the visco-elastic sealant material is configured to flow between neighboring cells within the enclosed multi-cell structure.

In one embodiment, the integral pressure reservoir is in a range of about 10 psi to about 60 psi. In one embodiment, the integral pressure reservoir is in a range of about 10 psi to about 100 psi. In one embodiment, the integral pressure reservoir is in a range of about 10 psi to about 80 psi. In one embodiment, the integral pressure reservoir is in a range of about 10 psi to about 50 psi. In one embodiment, the integral pressure reservoir is in a range of about 10 psi to about 40 psi. In one embodiment, the integral pressure reservoir is in a range of about 10 psi to about 30 psi. In one embodiment, the integral pressure reservoir is in a range of about 10 psi to about 20 psi. In one embodiment, the integral pressure reservoir is in a range of about 20 psi to about 100 psi. In one embodiment, the integral pressure reservoir is in a range of about 20 psi to about 80 psi. In one embodiment, the integral pressure reservoir is in a range of about 20 psi to about 60 psi. In one embodiment, the integral pressure reservoir is in a range of about 20 psi to about 50 psi. In one embodiment, the integral pressure reservoir is in a range of about 20 psi to about 40 psi. In one embodiment, the integral pressure reservoir is in a range of about 20 psi to about 30 psi. In one embodiment, the integral pressure reservoir is in a range of about 30 psi to about 100 psi. In one embodiment, the integral pressure reservoir is in a range of about 30 psi to about 80 psi. In one embodiment, the integral pressure reservoir is in a range of about 30 psi to about 60 psi. In one embodiment, the integral pressure reservoir is in a range of about 30 psi to about 50 psi. In one embodiment, the integral pressure reservoir is in a range of about 30 psi to about 40 psi. In one embodiment, the integral pressure reservoir is in a range of about 50 psi to about 100 psi. In one embodiment, the integral pressure reservoir is in a range of about 50 psi to about 80 psi. In one embodiment, the integral pressure reservoir is in a range of about 50 psi to about 60 psi. In some embodiments, the integral pressure reservoir may initially be higher than one of the ranges stated herein but after a period of time, the integral pressure reservoir may come to an equilibrium within one of the ranges stated herein.

In various embodiments, a method of use of the self-sealing system can comprise initiating a flow of the visco-elastic sealant material in response to a penetration into the enclosed multi-cell structure; and sealing the penetration into the enclosed multi-cell structure with the visco-elastic sealant material. In one embodiment, the method can comprise holding a fluid within a container comprising the enclosed multi-cell structure within a wall of the container; and preventing essentially all of the fluid from escaping through the penetration into the enclosed multi-cell structure. In one embodiment, the method can comprise releasing a tension load in a surface of the enclosed multi-cell structure; and providing energy to move the visco-elastic sealant material. In one embodiment, the method can comprise releasing a tension load in one of a plurality of nodes within the enclosed multi-cell structure; and providing energy to move the visco-elastic sealant material. In one embodiment, the method can comprise breaking one of a plurality of nodes configured to connect a first second surface to a second surface of the enclosed multi-cell structure; and increasing a thickness of a plug of the visco-elastic sealant material in the site of the penetration into the enclosed multi-cell structure.

In various embodiments, a self-sealing system can comprise a multi-cell structure comprising a first surface, a second surface, an outer edge configured to contain a volume between the first surface and second surface, and plurality of nodes within the volume and configured to connect the first surface and the second surface; a visco-elastic sealant material filling the volume; a pressure reservoir contained within the volume and configured to provide an internal positive pressure on the visco-elastic sealant material; and a tension load held in the plurality of nodes and configured to provide potential energy to push a portion of the visco-elastic sealant material.

In one embodiment, the self-sealing system can comprise a second tension load between at least two of the plurality of nodes and a portion of at least one of the first surface and the second surface and configured to provide potential energy to push a portion of the visco-elastic sealant material. In one embodiment, the self-sealing system can comprise a bladder comprising the multi-cell structure and configured to hold a fluid; and an access hole in the bladder and configured to contain the pressure reservoir within the volume. In one embodiment, the self-sealing system can comprise a rigid tank having an essentially hollow volume and configured to hold the bladder within the essentially hollow volume. In one embodiment, the self-sealing system can comprise a rigid structure in contact with at least one of the first surface and the second surface.

In some embodiments, a container can be configured to hold a fluid and can comprise the self-sealing system in at least one boundary of the container. In one embodiment, the self-sealing system can comprise a visco-elastic sealant material configured to be inert to a reaction with the fluid held in the container.

Various embodiments provide a method of sealing a penetration into a container. In various embodiments, a method of sealing a penetration into a wall of a container can comprise holding a visco-elastic sealant material under positive pressure enclosed inside a wall of a container; releasing potential energy enclosed inside the wall upon a penetration through the wall; forcing a flow of the visco-elastic sealant material with the released energy from inside the wall and into the penetration through the wall; filling the penetration through the wall with a portion of the visco-elastic sealant material; achieving an elastic equilibrium of the portion of the visco-elastic sealant material in the penetration through the wall; essentially stopping the flow of the visco-elastic sealant material into the penetration through the wall upon the achieving the elastic equilibrium; and preventing contents within the container from escaping the container through the penetration through the wall.

In one embodiment, the method can comprise sealing the penetration in the container with the visco-elastic sealant material. In one embodiment, the contents can include fuel and the container can be a fuel tank. In one embodiment, the method can comprise preventing a chemical reaction between the visco-elastic sealant material and the contents in the container.

In one embodiment, the method can comprise breaking at least one node connector within the wall; and increasing a thickness of a plug of the visco-elastic sealant material in the site of the penetration. In one embodiment, the method can comprise releasing a tension load in one of a plurality of nodes enclosed inside the wall and providing released energy to move the visco-elastic sealant material. In one embodiment, the method can comprise releasing a tension load in a surface of the enclosed multi-cell structure holding the positive pressure and enclosed inside the wall and providing released energy to move the visco-elastic sealant material. In one embodiment, the method can comprise plugging the penetration in the container with the visco-elastic sealant material.

With reference to FIG. 1, a partial cross-sectional view of a self-sealing system 100 is illustrated, in accordance with various embodiments. Self-sealing system 100 can comprise a multi-cell structure 110 located between a first surface 112 and an second surface 114. For example, second surface 114 can be a rigid outer structural shell, such as for example, a sandwich made of aluminum honeycomb between fiberglass, or a metal sheet. First surface 112 can be an elastic skin. In one embodiment, first surface 112 may be an elastomer sheet. In one embodiment, first surface 112 can be coupled to second surface 114 with fastener 133. In one embodiment, cell 113 may be created between first surface 112 and second surface 114 by the plurality of fasteners 133. The plurality of fasteners 133 can create nodes 120, which can define a volume of cell 113. Generally, four nodes 120 in an orthogonal pattern, such as a square or a rectangle, can define cell 113. In various embodiments, self-sealing system 100 comprises a plurality of cells 113, and each of the plurality of cells 113 may be in fluid communication with neighboring cells 113. In one embodiment, each cell 113 contains a portion of sealant material 115. In various embodiments, sealant material 115 can flow between neighboring cells 113.

In various embodiments, self-sealing system 100 incorporates sealant material 115 between second surface 114 and first surface 112. Self-sealing system 110 incorporates a pressure reservoir configured to provide positive pressure within self-sealing system 100. As such, the pressure reservoir provides potential energy for the moving of sealant material 115 upon penetration of self-sealing system 100. For example, the pressure reservoir creates a head pressure on sealant material 115 to force sealant material 115 to flow to an area that is at a lower pressure. Self-sealing system 100 may be enclosed on outer edges 166 in order to hold both sealant material 115 and positive pressure.

In one embodiment, placement of first surface, 112 over a layer of the sealant material 115, which is on second surface 114, and fastening first surface 112 with fastener 133 to second surface 114 can compress the sealant material 115 and stretch first surface 112. For example, first surface 112 using a fastener 133 can force first surface 112 to essentially touch second surface 114 at node 120. In one embodiment, first surface 112 has tension from the stretching and the sealant material 115 has been compressed and both the tension and the compression provide a pressure reservoir able to propel the sealant material 115 towards a penetration or a cored wound.

In one embodiment, self-sealing system 100 comprises sealant material 115, enclosed cell structure 110 surrounding sealant material 115, and pressure reservoir configured to maintain a positive pressure within enclosed cell structure 110. In one embodiment, a method of use of self-sealing system 100 can include the steps of initiating a flow of sealant material 115 in response to a penetration of at least one cell 113 of enclosed cell structure 110 and sealing the opening from the penetration with sealant material 115. In addition, the method can include the steps of holding a fluid within a container comprising self-sealing system 100 and preventing essentially all of the fluid from escaping through the opening. In one embodiment, self-sealing system 100 can include a multi-cell structure 110 comprising first surface 114, second surface 112, and plurality of cells 113 between first surface 114 and second surface 112; visco-elastic sealant material 115 in multi-cell structure 110; and a pressure reservoir in communication with the plurality of cells 113 and configured to provide positive pressure on visco-elastic sealant material 115.

Moving to FIG. 2, a partial cross-sectional view illustrating a self-sealing system, which comprises an alternative fastener with a bias member, is illustrated, in accordance with various embodiments. Self-sealing system 100 can comprise a multi-cell structure 110 located between a first surface 112 and an second surface 114. For example, second surface 114 can be a rigid outer structural shell, such as for example, a sandwich made of aluminum honeycomb between fiberglass, or a metal sheet. In one embodiment first surface 112 may be an elastic skin or a semi-rigid skin. In one embodiment, first surface 112 can be coupled to second surface 114 with fastener 133A. With reference now to FIG. 3, alternative fastener 133A is illustrated, in accordance with various embodiments. As shown in FIG. 3, fastener 133A comprises a threaded member 130, a bias member 127, and a threaded receiver 135. In some embodiments, a bias member 127 can be a spring or an elastomeric ring. In one embodiment, a bias member 127 can be a compression spring.

In one embodiment, cell 113 may be created between first surface 112 and second surface 114 by the plurality of fasteners 133A. The plurality of fasteners 133A can create nodes 120, which can define a volume of cell 113. Generally, four nodes 120 in an orthogonal pattern, such as a square or a rectangle, can define cell 113. In various embodiments, self-sealing system 100 comprises a plurality of cells 113, and each of the plurality of cells 113 may be in fluid communication with neighboring cells 113. In one embodiment, each cell 113 contains a portion of sealant material 115. In various embodiments, sealant material 115 can flow between neighboring cells 113.

In various embodiments, self-sealing system 100 can contain sealant material 115 in a plurality of cells 113 between second surface 114 and first surface 112. Self-sealing system 110 contains a pressure reservoir configured to provide positive pressure within self-sealing system 100. As such, the pressure reservoir provides potential energy for the moving of sealant material 115 upon penetration of self-sealing system 100. For example, the pressure reservoir creates a head pressure on sealant material 115 to force sealant material 115 to flow to an area that is at a lower pressure. Self-sealing system 100 may be enclosed on outer edges 166 in order to hold both sealant material 115 and positive pressure.

In one embodiment, placement of first surface 112 over a layer of the sealant material 115, which is on second surface 114, and fastening first surface 112 with fastener 133A to on second surface 114 can compress sealant material 115 and stretch first surface 112. In one embodiment, fastener 133A may be engaged by placing threaded member 130 through first surface 112, sealant material 115, and a hole in second surface 114; compression spring 127 and threaded receiver 135 are mounted to a portion of threaded member 130 extending out of the hole in second surface 114. For example, first surface 112 using a fastener 133A can force first surface 112 into sealant material 115 at node 120. In one embodiment, fastener 133A can control a tension on first surface 112. As shown in FIG. 2, the compression spring 127 provides compression to create the pressure reservoir to pressurize the sealant material 115. Fastener 133A can be adjusted to add more tension or ease tension on first surface 112 to control reservoir pressure.

In one embodiment, with use of fastener 133A or a like fastener, first surface 112 may be flexible but not necessarily elastic. In one embodiment, with use of fastener 133A or a like fastener, first surface 112 may be essentially flat, though not rigid. In one embodiment, first surface 112 has tension from bias member 127 and the sealant material 115 has been compressed and both the tension and the compression provide a pressure reservoir able to propel the sealant material 115 towards a penetration or a cored wound. In one embodiment, threaded member 130 and threaded receiver 135 can be replaced with a two-part rivet.

In various embodiments, sealant material 115 may be both plastic and elastic. The plastic property of sealant material 115 allows at least a certain amount of lateral flow through cell structure 110 toward the penetration or the cored wound. The elastic property of sealant material 115 prevents continued oozing of sealant material 115 through the penetration or the cored wound. This elastic property of sealant material 115 prevents the seal on the penetration or cored wound from being flushed away by a hydrostatic head of the fluid held by self-sealing system 100. In various embodiments, since the sealant material 115 may be both plastic and elastic, sealant material can be referred to as visco-elastic sealant material.

In various embodiments, sealant material 115 can be a gum. As described herein, gum must be able to flow into wound site from a surrounding area of the self-sealing system 100; however, gum must resist continued flow into wound site. In one embodiment, sealant material 115 may be a gum comprising a high viscosity/thixotropy and is elastic. As will be appreciated by those, skilled in the art, a ratio of viscosity to elasticity depends on various factors, such as, for example, ballistic threat, wall thickness, hydrostatic head of fluid contained and pressure reservoir in cell structure 110.

In various embodiments, components useful in making sealant material 115, include but are not limited to, silicone, water, ethylene glycol, propylene glycol, polyethylene glycol, polypropylene glycol, hydroxyethyl cellulose, polyvinyl alcohol, under-catalyzed silicone, fully catalyzed silicone, plasticized urethane, and combinations thereof. In various embodiments, sealant material 115 can be a mixture of a plastic component, an elastic component, and a miscible liquid component. In one embodiment, sealant material 115 can comprise a fluoro-silicone or fully catalyzed silicone expressly designed as visco-elastic gum. Sealant material 115 may have an operating temperature range of about −25° F. to about 160° F., at which both the plastic property and the elastic property of the sealant material 115 perform as described herein.

In various embodiments, self-sealing system 100 can be employed in the containment of hydrocarbon liquids, such as for example, gasoline, kerosene, aviation fuel, diesel, JP-1, JP-2. JP-3, JP-4, JP-5, JP-6, JP-7, JP-8, JPTS, Jet-A, Jet-B, other like fuels, fuel additives, and combinations thereof. In one embodiment, sealant material 115, for use in containment of hydrocarbon liquids, can comprise a combination of hydroxyethyl cellulose, polyvinyl alcohol, ethylene glycol, and water. In this embodiment, hydroxyethyl cellulose can provide the plastic component, and polyvinyl alcohol can provide the elastic component. In this embodiment, sealant material 115 may have an operating temperature from about −25° F. to about 180° F.

In one embodiment, sealant material 115 can comprise a mixture of 50 parts polyethylene glycol, 50 parts water, 4.2 parts hydroxyethyl cellulose, and 2.8 parts polyvinyl alcohol. For example, a sealant material 115 can be made by mixing at room temperature all four components then heating the mixture while stirring to 180° F. The mixture is brought to a boil for about 1 minute while continually stirring, and then the mixture is removed from heat. Water that has been boiled off is replaced to bring weight of the mixture back to the weight of the original 106 parts. The mixture, which is now one embodiment of sealant material 115, can be injected (at the elevated temperature) into cell structure 110. Alternatively, the mixture can be stored and then heated to about 180° F. to melt sealant material 115 for injection into cell structure 110.

Figure 4:
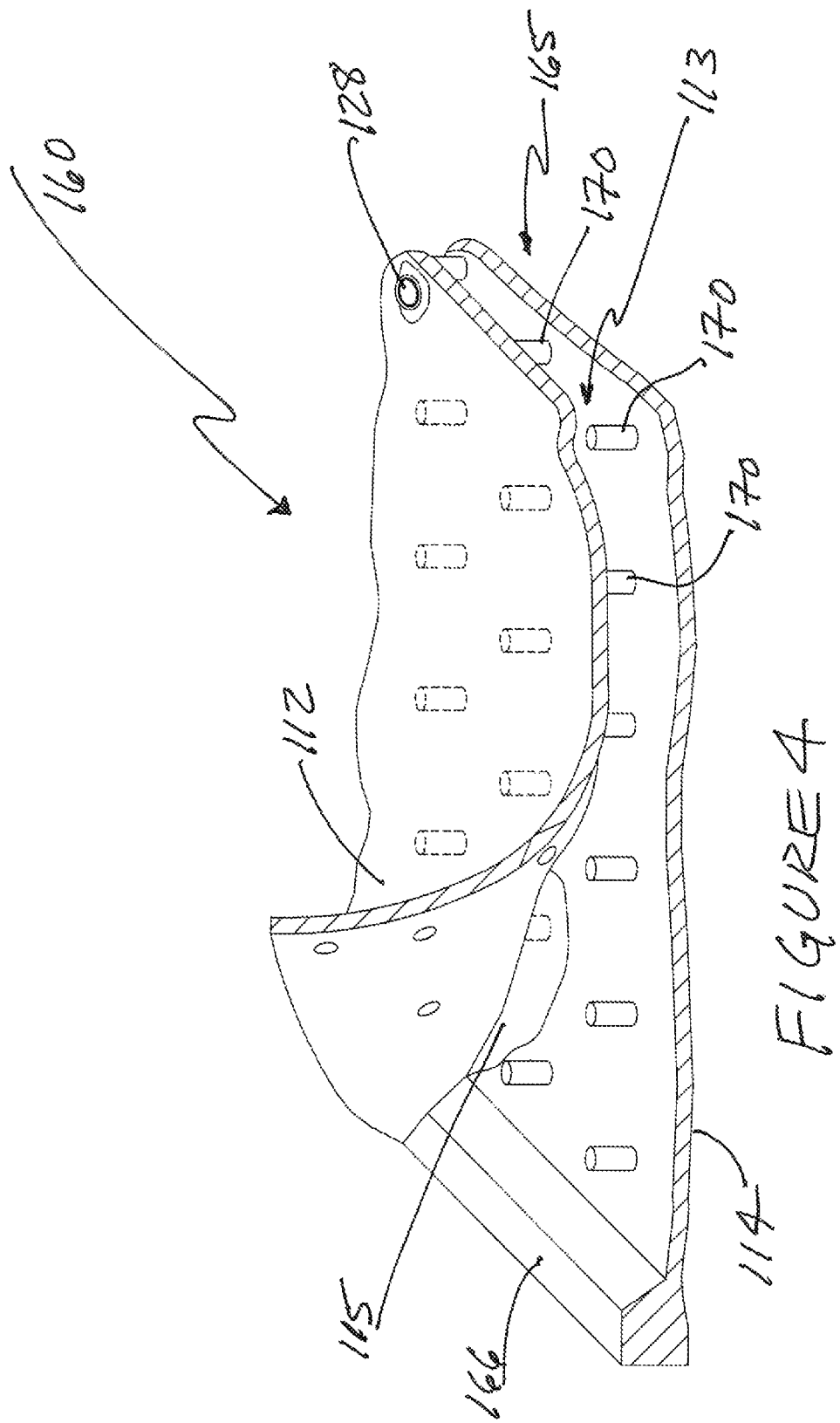
FIG. 4 is a partial fragmented perspective view illustrating an alternative configuration of a self-sealing system, in accordance with various embodiments.

Turning to FIG. 4, a partial fragmented perspective view illustrates an alternative configuration of self-sealing system 160, in accordance with various embodiments. Operation and methods of use of self-sealing system 160 is essentially equivalent to operation and method of use of self-sealing system 100, described herein. Self-sealing system 160 can comprise a multi-cell structure 165 located between a first surface 112 and an second surface 114. First surface 112 and second surface 114 can be a flexible skin. In one embodiment, first surface 112 can be coupled to second surface 114 with node connector 170, which acts as a tension spring to create the pressure reservoir to pressurize the sealant material 115 and cause the sealant material 115 to move upon penetration.

In one embodiment, node connector 170 may be elastic and can be integrated into both second surface 114 and first surface 112. For example, second surface 114, first surface 112, and node connector 170 can be one flexible and continuous piece. In one embodiment, self-sealing system 160 comprises no rigid or metal fasteners, which can lower weight of self-sealing unit 160 or can eliminate a possibility of rigid fastener becoming a projectile that can reenter the self-sealing system 160, or both. In one embodiment, self-sealing system 160 can be one flexible and continuous piece, which can be used in forming intricate shapes of, for example, fuel tanks.

In one embodiment, cell 113 may be defined by the boundaries of first surface 112, second surface 114, four nodes connectors 170 in an orthogonal pattern, such as a square or a rectangle, can define cell 113. In various embodiments, self-sealing system 160 comprises a plurality of cells 113, and each of the plurality of cells 113 may be in fluid communication with neighboring cells 113. In one embodiment, each cell 113 contains a portion of sealant material 115. In various embodiments, sealant material 115 can flow between neighboring cells 113.

In various embodiments, self-sealing system 160 incorporates a pressurized sealant material 115 between second surface 114 and first surface 112. Self-sealing system 110 relies on an integral pressure reservoir configured to provide positive pressure within self-sealing system 160. As such, the pressure reservoir provides potential energy for the moving of sealant material 115 upon penetration of self-sealing system 160. For example, the pressure reservoir creates a head pressure on sealant material 115 to force sealant material 115 to flow to an area that is at a lower pressure. Self-sealing system 160 is enclosed on outer edges 166 in order to hold both sealant material 115 and positive pressure.

In various embodiments, integral pressure reservoir stretches at least one of second surface 114, first surface 112, and one of any connector node 170. In some embodiments, at least one of second surface 114 and first surface 112 has tension load from the stretching and sealant material 115 has been compressed and both the tension and the compression provide potential energy to propel sealant material 115 towards a penetration or a cored wound. In various embodiments, any of node connectors 170 can have a tension load from the stretching, and sealant material 115 has been compressed, and both the tension and the compression provide potential energy to propel sealant material 115 towards a penetration or a cored wound. An elasticity in any of node connectors 170 can be greater than an elasticity in at least one of second surface 114 and first surface 112. In some embodiments, node connector 170 can hold more potential energy than amount of potential energy held in one of second surface 114 and first surface.

An elasticity in at least one of second surface 114 and first surface 112 can be tuned by material choice. For example, a surface comprising an elastomeric material can elongate than a surface comprising Kevlar or a non-elastic material. An elasticity in at least one of second surface 114 and first surface 112 may be limited by an elasticity of a fiber or sheet, which is bonded or laminated to one of the surfaces. For example, a ballistic nylon sheet, that is laminated to a skin (surface) constructed with a polyurethane rubber material, can limit the elasticity of the skin (surface) to the limits of elasticity of the ballistic nylon sheet. An elasticity in node connector 170 can be tuned by material choice. A node connector 170 comprising an elastomeric material, such as N-Buna rubber, can resist "creep" thus maintaining elasticity better than a node connector 170 comprising a material less resistant to "creep", such as a urethane based material. A material having greater elasticity can hold a greater tension load than material that is semi rigid. In various embodiments, a tension load can be between at least two node connectors 170 and a portion of at least one of second surface 114 and first surface 112. In some embodiments, any of the tension loads described herein can be configured to provide potential energy to push a portion of the sealant material 115. In various embodiments, pressure reservoir propels sealant material 115 to a penetration or a cored wound in self-sealing system 160.

A pressure reservoir can be created using a variety of pressurization methods and combinations of the pressurization methods. A pressure reservoir can be integrated into the self-sealing system by various means. In one embodiment, a gas can be added to sealant material 115 to form a pressurized foam. For example, high shear mixing sealant material 115 may be mixed with a gas, such as for example nitrogen, or carbon dioxide, or chlorofluorocarbon, such as for example, a CFC, such as Freon, and then injecting the mixture under high pressure into multi-cell structure 165 to create a pressure reservoir on sealant material 115.

A pressure reservoir may be integrated into self-sealing system 160 by various means. In one embodiment, self-sealing system 160 comprises node connector 170 integrated into both second surface 114 and first surface 112 to form a plurality of cells 113 and sealant material 115 fills the plurality of cells 113 under high pressure and elevated temperature as a foam, as described herein. In various embodiments, a sealant material source 125 may be connected to entry port 128 of multi-cell structure 165 to fill the cell structure 165 with the sealant material 115, and as the pressure increases within the cell structure 165, the elastic component of the cell structure 165 stretches, thus creating the pressure reservoir. In one embodiment, once pressure in multi-cell structure 165 has reached a predetermined value, sealant material source 125 may be removed and entry port 128 of multi-cell structure 165 may be sealed in order to maintain the pressure reservoir.

As will be apparent to one skilled in the art, self-sealing system 160 can be constructed in any of a variety of methods. For example, self-sealing system 160 can be constructed using a lost wax mold method, in which the node connectors 170 are molded in wax and the wax is melted and removed from the interior of the self-sealing system 160. In another example, self-sealing system 160 can be constructed using any eutectic metal mold method. In another example, self-sealing system 160 can be constructed by molding first surface 112 and node connectors 170 as one unit and then bonding node connectors 170 to second surface 114. In this example, any conventional adhesive for bonding the materials used in the construction may be employed. A bond between the materials may have a similar or a higher tensile strength as compared to the material. A bond between the materials is configured to have enough tensile strength to hold the materials together when the system is under pressure. In addition, the ends of node connectors 170 include a preparation step before the bonding to the second surface 114. The preparation step may include acid etching the ends, mechanically roughing the ends, incorporating a second material, such as, for example, a fiber or a glass, to the ends during the molding process, chemically treating the ends, and combinations thereof.

A material used to construct self-sealing system 160 should have elastomeric properties within at least the temperature ranges employed for sealant material 115. An example of a material used to construct self-sealing system 160 is nitrile rubber (also known as Buna-N or Perbunan). An example of a material used to construct self-sealing system 160 is polybutadiene (also known as Buna CB). An example of a material used to construct self-sealing system 160 is a polyester urethane material. An example of a material used to construct self-sealing system 160 is synthetic rubber. An example of a material used to construct self-sealing system 160 is a fluoro-silicone rubber. An example of a material used to construct self-sealing system 160 is a fluoro-carbon rubber. An example of a material used to construct self-sealing system 160 is styrene Butadiene (also known as Buna-S). An example of a material used to construct self-sealing system 160 is a perfluorocarbon rubber. An example of a material used to construct self-sealing system 160 is a silicone based rubber material. An example of a material used to construct self-sealing system 160 can be a combination of the materials discussed above. In one example, a Buna-N rubber material may be used to mold first skin 112 and node connectors 170 as one piece, then this piece can be bonded to second skin 114 comprising a polyester urethane rubber material. As will be appreciated by one skilled in art, a material choice for use in the construction of self-sealing system 160 may be limited by temperature ranges of sealant material 115, temperature ranges of the environment, pressure ranges of integral pressure, chemistry of the fluid in contact with self-sealing system 160, chemistry of sealant material 115, design/shape of a container employing self-sealing system 160, costs of material, and combinations thereof.

Figure 5:
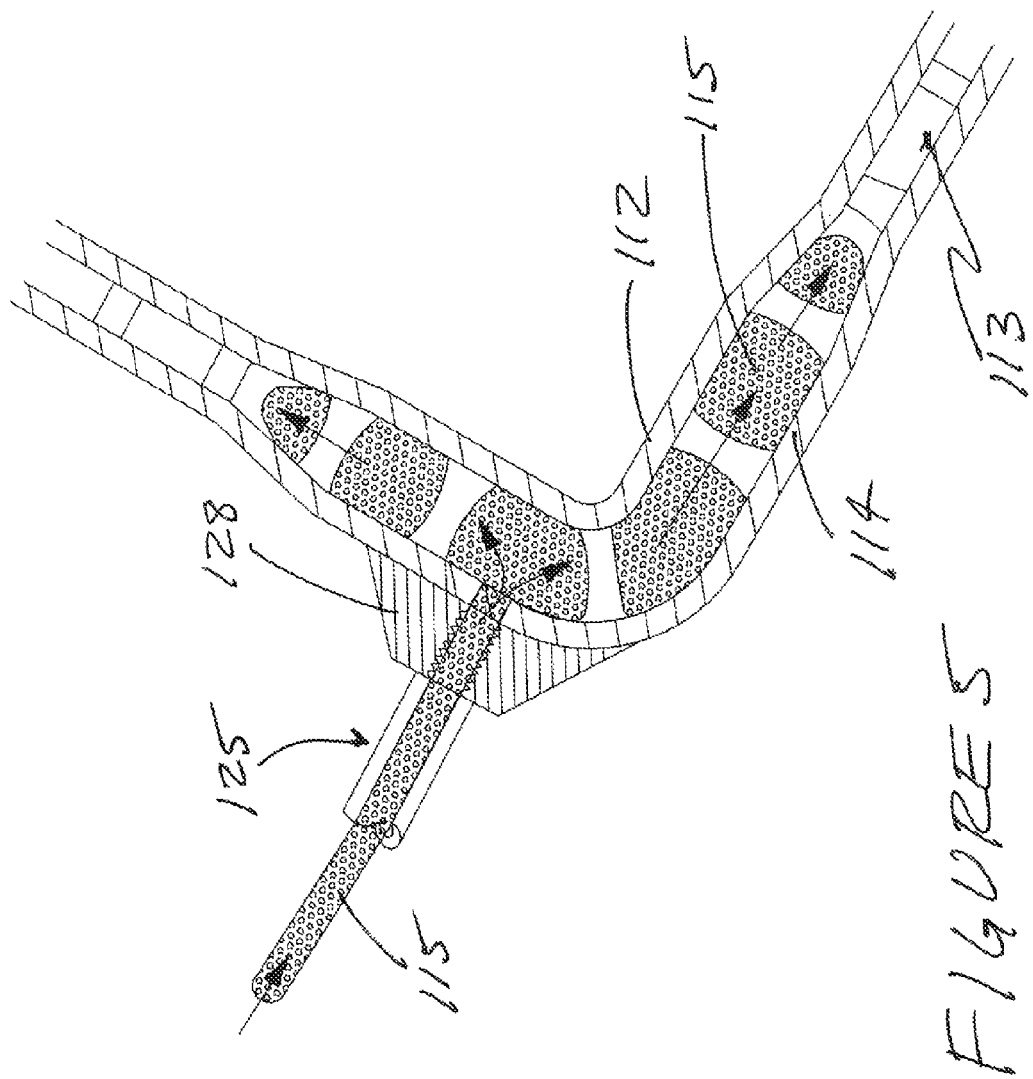
FIG. 5 is a partial diagrammatic cross-sectional view illustrating a method of filling a self-sealing system, in accordance with various embodiments.

Referring to FIG. 5, a partial diagrammatic cross-sectional view illustrates a method of filling a pressure reservoir within a self-sealing system, in accordance with various embodiments. In various embodiments, a sealant material source 125 is connected to an entry port 128 in cell structure 110 or 165, to fill the cell structure 110 or 165 with the sealant material 115, and as the pressure increases within the cell structure 110 or 165, the elastic component of the cell structure 110 or 165 stretches, thus creating the pressure reservoir. In one embodiment, once pressure in the cell structure 110 or 165 has reached a predetermined value, sealant material source 125 may be removed and cell structure 110 or 165 may be sealed in order to maintain the pressure reservoir. For example, the sealant material 115 can fill the cell structure 110 or 165 at an elevated temperature and at a pressure of about 10 psi to about 60 psi. In one embodiment, the sealant material 115 can fill the cell structure 110 or 165 at an elevated temperature of about 180° F. and at a pressure of about 30 psi to about 100 psi. If the cell structure 110 or 165 is over pressurized, the integrity of cell structure 110 or 165 will be compromised and the pressure reservoir may not be contained within the cell structure 110 or 165. In one embodiment, the cell structure 110 or 165 is filled with sealant material 115 to a predetermined displacement. For example, the cell structure 110 or 165 can be placed between two platens at a predetermined distance apart and the cell structure 110 or 165 can the filled with a volume of the sealant material 115 no greater than that allowed by the volume between the two platens.

Figure 6:
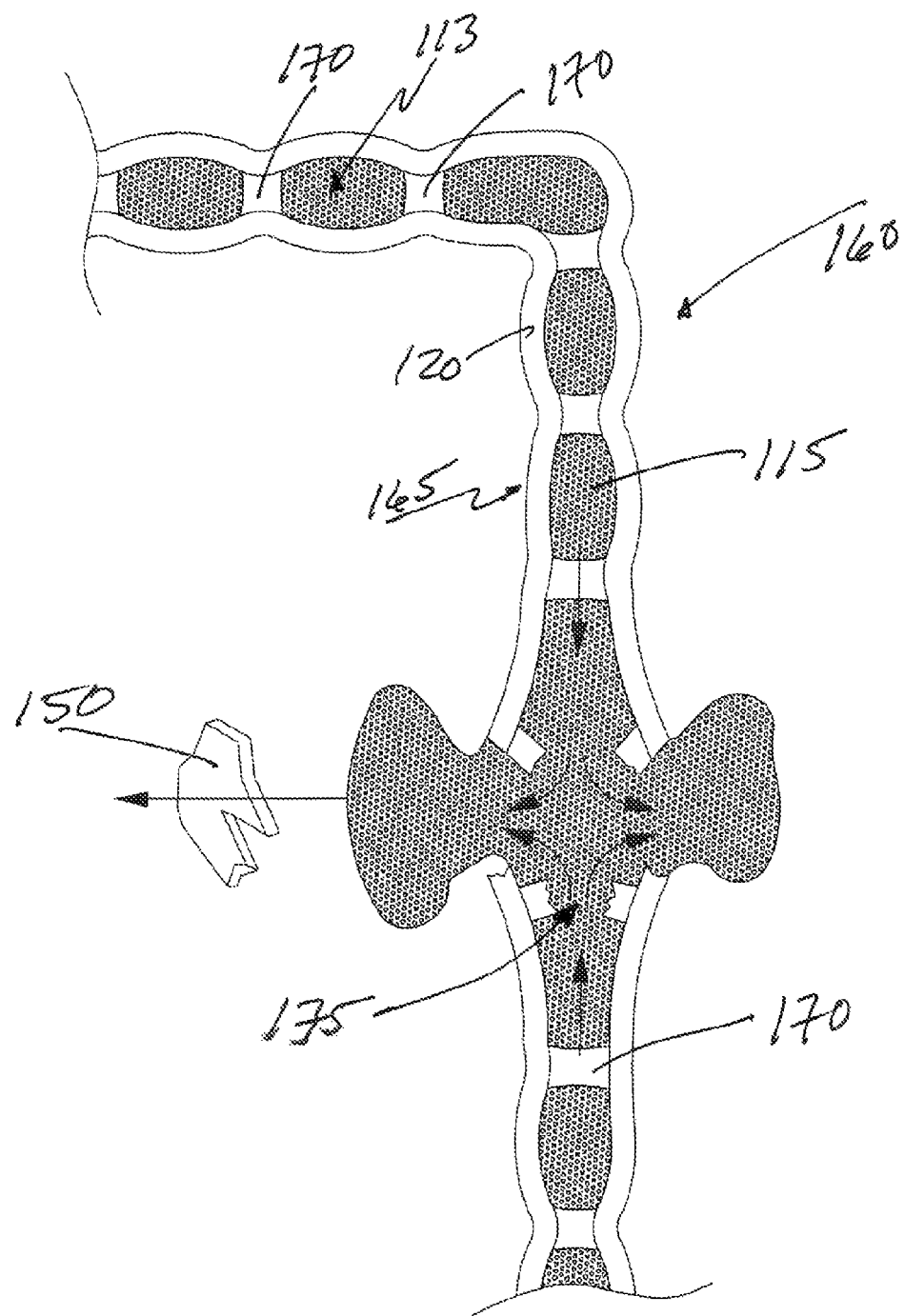
FIG. 6 is a partial diagrammatic cross-sectional view illustrating a method of sealing a penetration in a self-sealing system, in accordance with various embodiments.

With reference to FIG. 6, a partial diagrammatic cross-sectional view illustrates a method of sealing a penetration in self-sealing system 160, in accordance with various embodiments. A projectile 150 goes through self-sealing system 160 creating penetration site 180, which may be referred to at times as a wound or a cored wound or a bullet hole. As soon as penetration site 180 is created, sealant material 115 begins to flow to penetration site 180 (as indicated by arrows) and fills the penetration site 180. In one embodiment, a tension load in a surface of cell structure 165 can provide energy to move sealant material 115. In some embodiments, a tension load in at least one connector node 170 can provide energy to move sealant material 115.

Upon impact of projectile 150 into cell structure 165, at least one node 170 immediately adjacent to the impact is severed at a point 175 between first surface 112 and second surface 114. In various embodiments, the severing at point 175 releases the tension load in at least one node 170. In some embodiments, the severing at point 175 releases the tension load in at least one of first surface 112 and second surface 114. In some embodiments, the severing at point 175 releases the compression load in a portion of the sealant material 115. In one embodiment, the severing at point 175 releases sealant material 115 into penetration site 180. In one embodiment, the severing at point 175 can provide increased volume in a cell 113 adjacent to point 175, which may increase a thickness of a plug of sealant material 115 sealing penetration site 180.

In one embodiment, pressure reservoir integral to cell structure 165 moves sealant material 115 to an area of lower pressure, which is at penetration site 180. In one embodiment, sealant material 115 continues to flow until penetration site 180 is filled and sealant material 115 comes to an elastic equilibrium. Upon elastic equilibrium, flow of sealant material 115 to penetration site 180 essentially stops. In one embodiment, sealant material 115 seals or essentially seals penetration site 180.

Figure 7:
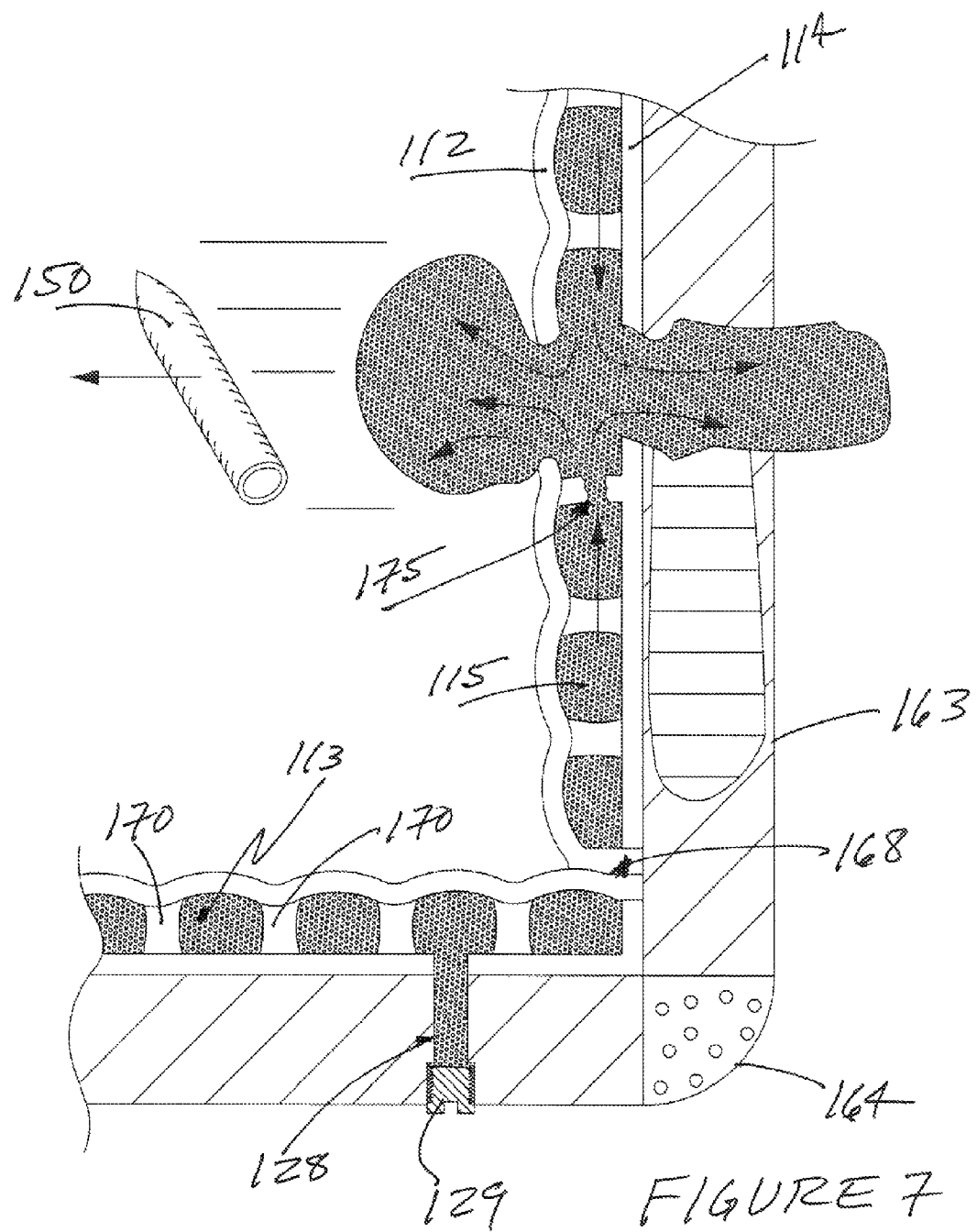
FIG. 7 is a partial diagrammatic cross-sectional view illustrating a method of sealing a penetration in a self-sealing system with a corner section, in accordance with various embodiments.

Turning to FIG. 7, is a partial diagrammatic cross-sectional view illustrates a method of sealing penetration site 180 in self-sealing system 165, in accordance with various embodiments. A projectile 150 goes through self-sealing system 165 and substrate 163 creating penetration site 180, which may be referred to at times as a wound or a cored wound or a bullet hole. In various embodiments, substrate 163 can be substantially planar and a substantially rigid. For example, substrate 163 can be an aluminum sheet, or a titanium sheet, or an alloy sheet, or a composite sheet, or a sandwich, such as an aluminum honeycomb between fiberglass. In one embodiment, corner 164 connects opposing substrates 163. As illustrated, entry port 128 can be bored a portion of substrate 163 and connected to cell structure 163. Plug 129 can seal entry port 128 to contain sealant material 115 and integral pressure within call structure 165. In one embodiment, overlap 168 of two self-sealing systems 160 can seal a penetration through corner 164.

As soon as penetration site 180 is created, sealant material 115 begins to flow to penetration site 180 (as indicated by arrows) and fills the penetration site 180. In one embodiment, projectile 150 is tumbling, as illustrated, and creates penetration site 180, which is uneven and larger than a diameter of projectile 150. In one embodiment, pressure reservoir pushes sealant material 115 to an area of lower pressure, which is at penetration site 180. In one embodiment, sealant material 115 continues to flow until penetration site 180 is filled and sealant material 115 comes to an elastic equilibrium. Upon elastic equilibrium, flow of sealant material 115 to penetration site 180 essentially stops. In one embodiment, sealant material 115 seals or essentially seals penetration site 180 in self-sealing system 100. In one embodiment, sealant material 115 seals or essentially seals penetration site 180 that is uneven and larger than a diameter of projectile 150.

In various embodiments, a method of sealing a penetration can include the steps of initiating flow of sealant material 115 upon penetration of self-sealing system filling penetration site 180 with sealant material 115; and sealing penetration site 180. In one embodiment, a method can include stopping flow of sealant material 115 upon elastic equilibrium of sealant material 115. In one embodiment, a method can include preventing contents behind self-sealing system from escaping through penetration site 180.

In various embodiments, a method of sealing a penetration can include the steps of initiating flow of sealant material 115 upon penetration of self-sealing system 160; filling penetration site 180 with sealant material 115; and sealing penetration site 180. In one embodiment, a method can include stopping flow of sealant material 115 upon elastic equilibrium of sealant material 115. In one embodiment, a method can include breaking at least one node connector 170 to increase a thickness of a plug of sealant material 115 to penetration site 180. In one embodiment, an increased thickness of a plug of the sealant material 115 can prevent a blow out of a seal in the penetration site 180. In one embodiment, a method can include preventing contents behind self-sealing system 160 from escaping through penetration site 180.

Various embodiments provide methods of sealing a penetration 180 in a container. In one embodiment, a method of sealing a penetration 180 in a container includes the steps of providing positive pressure to visco-elastic sealant material 115 located inside a wall of a container; forcing a flow of visco-elastic sealant material 115 from inside the wall and into penetration site 180 in the wall; filling penetration site 180 with a portion of visco-elastic sealant material 115; achieving an elastic equilibrium of the portion of visco-elastic sealant material 115 in penetration site 180; essentially stopping the flow of visco-elastic sealant material 115 into penetration site 180 upon the achieving the elastic equilibrium of visco-elastic sealant material 115; and preventing contents within the container from escaping the container through penetration site 180. In one embodiment, a method can include sealing penetration site 180 in the container with sealant material 115. In one embodiment, a method can include preventing a chemical or physical reaction between sealant material 115 and the contents in the container.

Figure 8:
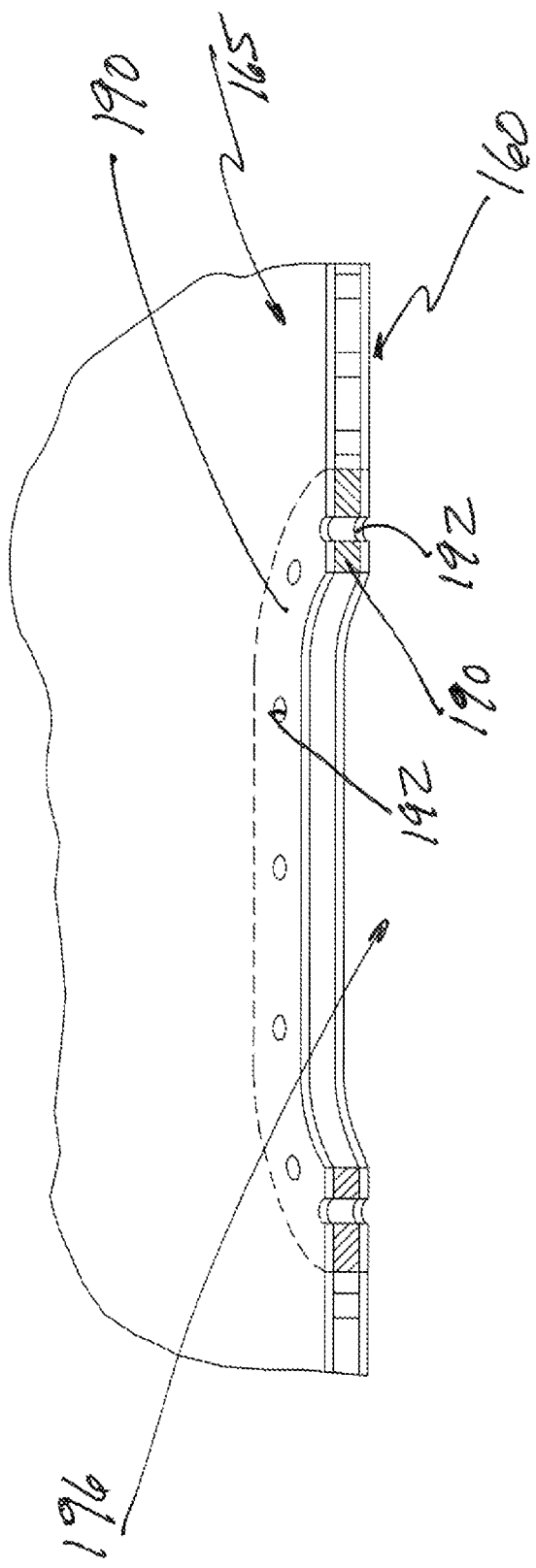
FIG. 8 is a partial perspective cross-sectional view illustrating an access hole within a self-sealing system, in accordance with various embodiments.

Now turning to FIGS. 8-10, access hole 196 into self-sealing system 100 is illustrated according to various embodiments. Access hole 196 may be used to fill a container comprising self-sealing system 100 or 160, such as a fuel tank, with a fluid. Of course, access hole 196 may be used to drain the container. In addition, access hole 196 may be used to interface sensors, pumps, piping, and the like to the container. In various embodiments, access hole 196 may be defined by collar 190, which surrounds access hole 196. In one embodiment, collar 190 comprises a plurality of bolt holes 192. As illustrated in FIG. 10, bolt 198 is guided through one of the plurality of bolt holes 192 and then engaged with nut ring 194. In one embodiment, bolt 198 may be used to attach cover 199 to collar 190 to seal a fluid within the container. In one embodiment, nut ring 194 comprises, a thread. In some embodiments, nut ring 194 is attached to collar 190 with an adhesive. In one embodiment, nut ring 194 is integrated in collar 190. In one embodiment, an adhesive can be used to connect collar 190 to self-sealing system 100 or 165.

NON-LIMITING EXAMPLES

Example 1

A pressure reservoir can be created by relying on elastic node connectors, as described herein. One example of constructing a self-sealing system includes the following steps: Cast a 0.02 to 0.4 inch thick wax sheet; Drill uniformly spaced holes of about 0.170 to about 0.35 inch in diameter in wax sheet; Provide a flat, level, substrate; Mix and degas a quantity of uncured elastomer and pour into or onto preset substrate; Lay perforated wax sheet into wet elastomer and allow elastomer to flow through holes; Pour (or laminate) a top layer to complete basic construct; Allow low temperature cure (lower than melting point of wax); Attach a drain/injection port into one corner and a vent in an opposing corner then cure; Melt out wax core; Inject molten sealant material to a prescribed quantity and pressure; Seal drain/injection port and vent then allow to cool.

Example 2

The self-sealing system constructed in Example 1 was tested with 12 gauge shotgun slugs. Penetration sites of about 0.7 inch in diameter are created. Sealing of penetration sites is instantaneous. Close proximity penetration sites seal instantaneously, if there is a sufficient sealant material and pressure reservoir. Test was conducted at about standard temperature and pressure.

Example 3

At least fifty specimens of the various cell configurations, including variations in cell structure material and in sealant material, have been ballistically tested with varying degrees of success and hundreds of static and environmental tests have been conducted. Twelve gauge shotgun slugs were used in most tests, which created a large gaping wound, approximately 15 mm diameter. In order to keep costs to a minimum all the early specimens were shot without a liquid backing. Tests for leakage were done by merely placing the mouth over the wound and blowing hard. This was done as quickly as possible after the specimen had been struck, less than five seconds lapse time. In almost all cases the wound had sealed completely. Subsequent tests with a water-filled standpipe placed over the wound showed resistance to blowout of at least a 50-inch (125 mm) head of water, the height limit of the standpipe. It was estimated that depending on wound size; this resistance to blowout could exceed 20 psi.

The first test of a fluid backed specimen of the type described in FIG. 7 using an 8 mm thick sealant material layer was clamped to the face of a 14 inch diameter steel tank filled with water. A 12 gauge shotgun slug was fired to create a large wound. Additionally, a high-speed film of the bullet strike showed no loss of fluid through the wound, indicating an instantaneous seal. Test was conducted at about standard temperature and pressure.

Example 4

A test with a 12 gauge buckshot load, fired at a distance of muzzle to target less than two feet. Impact of this shot was only three inches [75 mm] away from a previous 12 gauge slug wound made the previous day. The specimen was a 6 mm (⅛") thick aluminum face over a one half inch thick layer of sealant material, backed by a two-ply construct of ballistic nylon cloth. The sealant material comprised an ethylene glycol based formula. The compression device was a series of compression springs, similar to what is shown in FIGS. 2 and 3, spaced one inch apart and contained by 10-24 machine screws. The springs were loaded to ten pounds and had a stroke of only 0.150 inch, which proved to be an inadequate stroke to move, the large quantities of available sealant material to seal the buckshot wound of the second day. Although the bullet wound (about 20 mm diameter), fired the previous day had sealed immediately, enough sealant material had bulged through the wound during the time lapse that less than one half the spring stroke remained to accommodate the subsequent hit which left a much larger wound in the aluminum face—1.6"×2". Surprisingly, the wound almost completely closed, leaving only a pinhole of light. Then, by taking only one full turn on each screw, the buckshot wound closed completely, leaving a substantial bulge of gum on both faces of the specimen. This suggests that a larger pressure reservoir may be used for sealing large multiple wounds. Test was conducted at about standard temperature and pressure.

Example 5

Although the visco-elastic properties of the sealant material vary greatly and are still viable for many different parameters, such as for example, but not limited to, sealant material thickness, reservoir pressure, probable wound size in a container. A test was devised for setting a standard for one particular type of sealant material. A one half inch diameter steel rod, weighing 325 grams was allowed to rest at top center of a 2.5 cm high, 7.5 cm diameter specimen of gum for a prolonged period of time (about one hour). A sealant material of insufficient elasticity would allow the rod to sink all the way to the bottom, while too much elasticity would allow only about 6 mm penetration, no matter how long the weight was applied. An ideal sealant material would allow the rod to sink to about 6 mm from the bottom. Tests were conducted under standard room temperature conditions.

Example 6

A test was conducted on an actual fuel tank, made of urethane/nylon, similar to the construction shown in FIGS. 4-6. The cell walls were injected with a plasticized urethane gum and pressurized to approximately 50 psi. The tank, measuring 19"×21"×6.5", was allowed to stabilize at room temperature for three months before testing. The tank was then set upright, filled with 120° F. water and shot with a 12 gauge slug approximately four inches from the bottom. Estimated loss of water was one to two ounces before completely sealing. No further leakage occurred in the ensuing 24 hours, when the test was terminated.

While the above test proved the efficacy of the sealing system, the fact that the wound failed to completely seal before losing even that small amount of liquid suggests what previous creep tests of that particular urethane structure had shown—that a significant amount of elasticity of the urethane tie columns had been lost during the three month time lapse. A highly creep-resistant tie column such as nitrile rubber may be desirable, especially when confronting really large gaping wounds. The test was conducted at about standard temperature and pressure.

In addition to the ballistic tests, various embodiments of the self-sealing system have been substantiated by hundreds of static and environmental tests.

Example 7

Two test specimens, essentially as described in FIG. 4, were constructed for the purpose of sustaining multiple close proximity hits. Each specimen contained a propylene glycol based sealant material. Each specimen was constructed using a polyester urethane rubber material. Each specimen had an internal pressure of about 50 psi. After construction of the specimen, each specimen was stored for two weeks. The internal pressure of each specimen was estimated to be about 30 psi at the time of the test. Target areas in the specimen were 12 inches in diameter and the projectiles were 12 gauge shotgun slugs. Seven hits were made into each specimen. The pattern of the hits was one in the center and then six in a circle at the 60° points around the circle. All of the hits in the pattern which located about 3 inches apart. The shotgun was fired at about 5 second intervals to produce the pattern of hits in each specimen. Although the exact time to seal each would was impossible to obtain, by the time the seven shot sequence was completed, all of the wounds in the specimen had closed. These results were repeatable for each specimen. Tests were conducted at about standard temperature and pressure.

Example 8

A test was conducted on a 12 inch diameter specimen configured essentially as described FIG. 7. A 1¼ inch hole saw was used to cut a hole through the specimen to simulate a shape charge wound site. The specimen contained a propylene glycol based sealant material. The specimen was constructed using a polyester urethane rubber material. The specimen had an internal pressure of about 20 to 30 psi. The sealant material sealed the wound site. However, this sealant material lacked the desired elasticity to quickly achieve equilibrium in the wound site. As a result, although the wound site was closed in about one second, the sealant continued to extrude yielding a column of sealant material of about 2½ inches long. Test was conducted at about standard temperature and pressure.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein.

Various embodiments and the examples described herein are exemplary and not intended to be limiting in describing the full scope of compositions and methods of this invention. Equivalent changes, modifications and variations of various embodiments, materials, compositions and methods may be made within the scope of the present invention, with substantially similar results.

In the foregoing specification, the invention has been described with reference to various embodiments. Modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claim may be executed in any order and are not limited to the specific order presented in the claims. Additionally, the components and/or elements recited in any apparatus or system claim may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, system, composition or apparatus that comprises a list of elements does not include only those elements recited, but may also include other elements not expressly listed or inherent to such process, method, article, system, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A self-sealing system comprising:
   a visco-elastic sealant material comprising an elastic equilibrium, wherein the visco-elastic sealant material configured to be nonreactive to a contained fluid;
   an enclosed multi-cell structure comprising a first skin, a second skin, and an outer edge configured to surround the visco-elastic sealant material, and a plurality of elastic nodes configured to connect the first skin and the second skin, wherein the first skin and the second skin are impervious to the contained fluid;
   an integral pressure reservoir configured to maintain a positive pressure within the enclosed multi-cell structure and configured to provide potential energy to move the visco-elastic sealant material; and
   a spring tension load held by the plurality of elastic nodes and configured to provide at least a portion of the potential energy to move a portion of the visco-elastic sealant material to a low pressure area created by a puncture in the enclosed multi-cell structure.

2. The system according to claim 1, wherein at least one of the plurality of elastic nodes is configured to break upon release of at least a portion of the positive pressure within the enclosed multi-cell structure.

3. The system according to claim 1, wherein at least one of the plurality of elastic nodes is loaded with a releasable tension configured to provide at least a portion of the potential energy to move the visco-elastic sealant material.

4. The system according to claim 1, wherein a portion of at least one of the first skin and the second skin is loaded with a releasable tension configured to provide at least a portion of the potential energy to move the visco-elastic sealant material.

5. The system according to claim 1, wherein at least one of the first skin and the second skin is non-rigid.

6. The system according to claim 1, wherein the enclosed multi-cell structure comprising a first skin, a second skin, and an outer edge is configured to hold the integral pressure reservoir between the first skin and the second skin.

7. The system according to claim 1, wherein the enclosed multi-cell structure is one continuous piece.

8. The system according to claim 1, wherein the visco-elastic sealant material is configured to flow between neighboring cells within the enclosed multi-cell structure.

9. A self-sealing system comprising:
   a multi-cell structure comprising a first surface, a second surface, an outer edge configured to contain a volume between the first surface and second surface, and a plurality of elastic nodes within the volume and configured to connect the first surface and the second surface, wherein the first skin and the second skin are impervious to the contained fluid;
   a visco-elastic sealant material filling the volume and configured to have an elastic equilibrium, wherein the visco-elastic sealant material configured to nonreactive to a contained fluid;
   a pressure reservoir contained within the volume and configured to provide an internal positive pressure on the visco-elastic sealant material; and
   a spring tension load held in the plurality of elastic nodes and configured to provide potential energy to push a portion of the visco-elastic sealant material.

10. The self-sealing system according to claim 9, further comprising:
    a spring second tension load between at least two of the plurality of elastic nodes and a portion of at least one of the first surface and the second surface and configured to provide potential energy to push a portion of the visco-elastic sealant material.

11. The self-sealing system according to claim 9, further comprising:
    a bladder comprising the multi-cell structure and configured to hold a fluid; and
    an access hole in the bladder and configured to contain the pressure reservoir within the volume.

12. The self-sealing system according to claim 11, further comprising:
    a rigid tank having an essentially hollow volume and configured to hold the bladder within the essentially hollow volume.

13. A container configured to hold a fluid and comprising the self-sealing system according to claim 9 in at least one boundary of the container.

14. The container according to claim 13, wherein the visco-elastic sealant material is inert to a reaction with the fluid.

15. The self-sealing system according to claim 9, further comprising a rigid structure in contact with at least one of the first surface and the second surface.

16. The self-sealing system according to claim 9, wherein the first surface and the plurality of elastic nodes are molded as one piece comprising a first material, and the second surface comprises a second material and is bonded to the plurality of elastic nodes of the first piece.

17. The self-sealing system according to claim 16, wherein the first material is a Buna-N rubber material and the second material is a polyester urethane rubber material.

18. A self-sealing system comprising:
    a visco-elastic sealant material comprising an elastic equilibrium, wherein the visco-elastic sealant material is configured to be nonreactive to a contained fluid;
    an enclosed multi-cell structure surrounding the visco-elastic sealant material comprising:
      a first skin;
      a second skin, wherein the first skin and the second skin are impervious to the contained fluid;
      an outer edge configured to contain the visco-elastic sealant material between the first skin and the second skin; and
      a plurality of elastic nodes configured to connect the first skin and the second skin; wherein at least one of the plurality of elastic nodes is loaded with a releasable spring tension configured to provide at least a portion of the potential energy to move the visco-elastic sealant material; and
    an integral pressure reservoir configured to maintain a positive pressure within the enclosed multi-cell structure and configured to provide potential energy to move the visco-elastic sealant material.

19. The system according to claim 18, wherein at least one of the plurality of elastic nodes is configured to break upon release of at least a portion of the positive pressure within the enclosed multi-cell structure.

20. The system according to claim 18, wherein a portion of at least one of the first skin and the second skin is loaded with a releasable tension configured to provide at least a portion of the potential energy to move the visco-elastic sealant material.

21. The system according to claim 18, wherein at least one of the first skin and the second skin is non-rigid.

22. The system according to claim 18, wherein the enclosed multi-cell structure is configured to hold the integral pressure reservoir between the first skin and the second skin.

23. The system according to claim 18, wherein the enclosed multi-cell structure is one continuous piece.

24. The system according to claim 18, wherein the visco-elastic sealant material is configured to flow between neighboring cells within the enclosed multi-cell structure.

* * * * *